United States Patent
Kado et al.

[15] 3,668,973
[45] June 13, 1972

[54] HYDRAULIC OIL WINCH

[72] Inventors: Matayuki Kado; Masazo Mita, both of Komatsu, Japan

[73] Assignee: Kabushiki Kaisha Komatsu Seisakusho, Tokyo, Japan

[22] Filed: June 29, 1970

[21] Appl. No.: 50,754

[30] Foreign Application Priority Data

June 30, 1969 Japan..................................44/51348

[52] U.S. Cl..................................91/41, 91/45, 60/53 WW
[51] Int. Cl.......................................................F15b 15/26
[58] Field of Search........................91/41, 45; 60/53 WW

[56] References Cited

UNITED STATES PATENTS

| | | |
|---|---|---|
| 2,902,005 | 9/1959 | Panissidi..................................91/41 |
| 3,499,286 | 3/1970 | Reischl..................................60/53 WW |
| 1,085,964 | 2/1914 | Briggs..................................91/45 |
| 2,189,094 | 2/1940 | Weaver..................................91/45 |

*Primary Examiner*—Everette A. Powell, Jr.
*Assistant Examiner*—Clemens Schimikowski
*Attorney*—Cushman, Darby & Cushman

[57] ABSTRACT

A hydraulic oil winch wherein the driving shaft of the hydraulic oil motor is provided with a ratchet wheel, and a lock pawl is pivotally mounted on a shaft so as to detachably engage with the said ratchet wheel, the said lock pawl being interlocked with a hydraulic oil cylinder mechanism so that it may be engaged with the said ratchet wheel when the hydraulic oil motor is running forwardly and stopped, and also may be disengaged from the ratchet wheel when the oil motor is running reversely by change-over operation of the change-over valves.

3 Claims, 6 Drawing Figures

3,668,973

HYDRAULIC OIL WINCH

The present invention relates to a hydraulic oil winch, and more particularly to a hydraulic oil winch which can be mounted on a vehicle such as a tractor and the like for towing a weight cargo.

Generally, it is desirable for such kind of winch that it can be operated simply without necessitating the adjustment for the mechanism of every part thereof and is constructed in a compact design so as to be easily fitted to and removed from the vehicle. In the prior art hydraulic oil winches, however, a band type brake has mainly been employed as the braking mechanism thereof. Such type of braking means for winch requires artificial adjustment of the clearance between the brake band and the brake drum, and therefore such type is not suitable for the power transmission system of hydraulic oil pump and hydraulic oil motor. It is also a common practice in the braking mechanism of winch that its braking action and brake releasing action are interlocked with the control of the forward and reverse rotation and stop of the winch. However, in the case of the hydraulic oil winch, it is substantially necessary to provide it with control valves having a special mechanism respectively which is constructed integrally with the hydraulic oil motor thereof. Other than the above system, there has been used an electric interlocking control system wherein the control valve of hydraulic oil motor is provided with a limit switch which can be interlocked with a solenoid valve for controlling the release of the braking power. In this system, however, its control valve and hydraulic oil circuit have a special construction respectively, so that when they are mounted on the vehicle, the hydraulic oil equipment parts and hydraulic oil control circuit which are already fitted on the vehicle can not be fully utilized, consequently needing a new design and making fitting and removal of them to and from the vehicle difficult.

The present invention has been made in order to eliminate such defects as mentioned above in the prior art, and has for its first object to provide a hydraulic oil winch which is equipped with a special automatic control mechanism for winch drum.

A second object of the present invention is to provide a hydraulic oil winch wherein the braking of winch drum can be effected by means of a locking mechanism for preventing the winch drum from reverse rotation.

A third object of the present invention is to provide a hydraulic oil winch wherein the locking and unlocking operation of a locking mechanism for braking the winch drum can be effected automatically by change-over operation of an oil pressure change-over valve which can allow the hydraulic oil motor to rotate forwarding and reversely and stop.

A fourth object of the present invention is to prevent the reverse rotation of the winch drum during the forward rotation of the hydraulic oil motor by the locking action of the locking mechanism for controlling the winch drum associated with the change-over operation of the oil pressure change-over valves of the hydraulic oil motor, and at the same time, to effect automatic and precise braking of winch drum whenever the hydraulic oil motor is allowed to stop, whereby improving the safety in winch handling operation.

A fifth object of the present invention is to allow the above-mentioned locking mechanism for braking winch drum to effect unlocking action automatically when the hydraulic oil motor is running reversely.

A sixth object of the present invention is to provide a locking mechanism for braking winch drum having a simple design comprising a rachet wheel provided with one-way clutch interlocked with the hydraulic oil motor and a lock pawl engageable with and disengageable from the said ratchet wheel through extension and retraction of a hydraulic oil cylinder capable of actuating in response to the operation of the oil pressure change-over valves of the hydraulic oil motor, thereby making the whole construction of hydraulic oil winch simple and compact so that the hydraulic oil winch may be fitted to and removed from a vehicle in a simple manner at any time.

Figure 1:
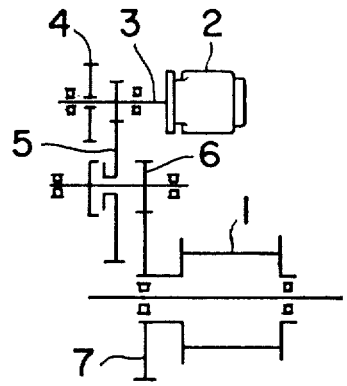
FIG. 1 is a schematic view showing the power transmission line system of the winch drum.
Figure 2:
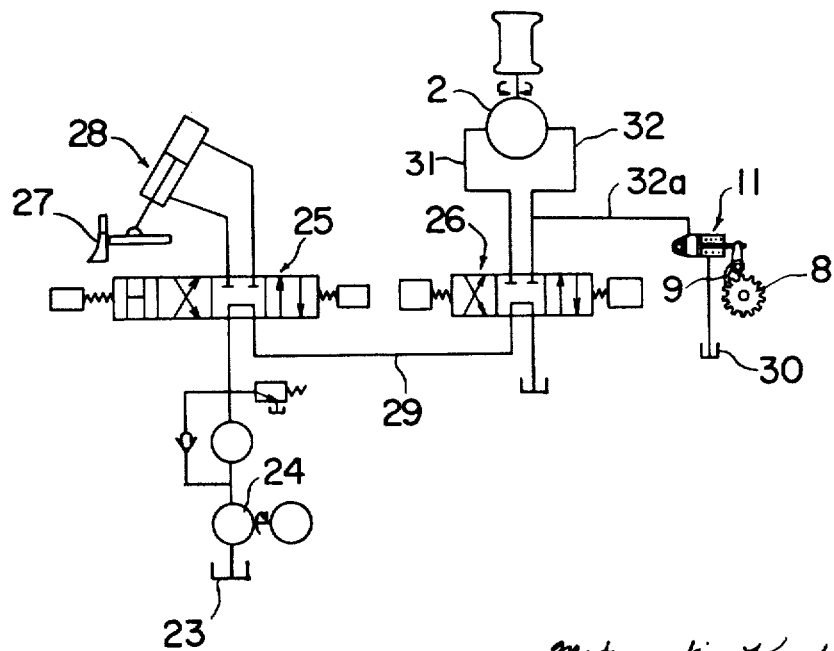
FIG. 2 is a circuit diagram for controlling hydraulic oil pressure according to one embodiment of the present invention.
Figure 3:
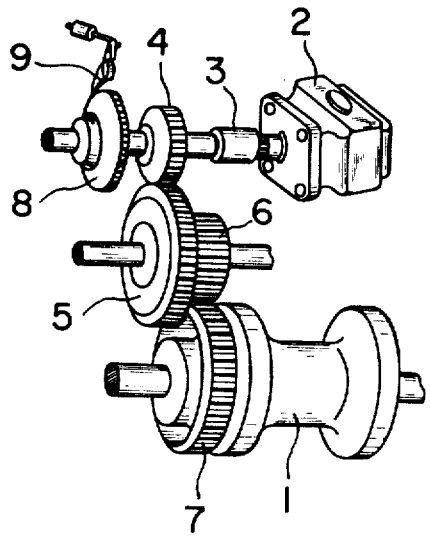
FIG. 3 is an enlarged perspective view of the winch control mechanism.
Figure 4:
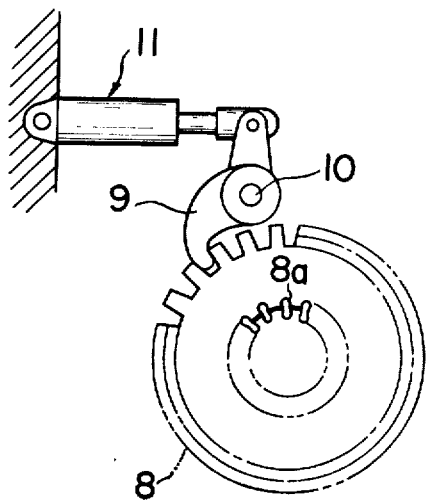
FIG. 4 is an enlarged front elevational view of the locking mechanism thereof.
Figure 5:
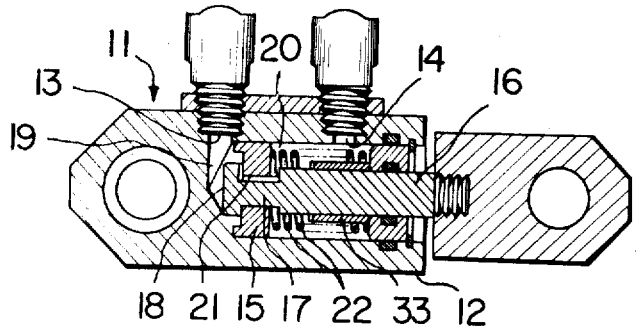
FIG. 5 is an enlarged cross-sectional view of the hydraulic oil cylinder of the said lock mechanism.

One embodiment of the present invention will now be described below with reference to the accompanying drawings. Referring to the drawings, the reference numeral 1 denotes a winch drum which can be mounted on the rear part of a vehicle for construction use for towing a weight cargo and is adapted to be driven forwardly and reversely by means of a hydraulic oil motor 2. As shown in FIG. 1 and FIG. 3, the said winch drum 1 is rotatably driven through a drive gear 4 mounted on the rotary driving shaft 3 of the hydraulic oil motor 2 and follower gears 5, 7 which engage in turn with the drive gear 4 to be rotated. As shown in FIG. 3 and FIG. 4, on the drive shaft 3 of the said hydraulic oil motor 2 is also mounted a ratchet wheel through one-way clutch 8a, separately from the above-mentioned drive gear 4. A lock pawl 9 is detachably engaged with the ratchet wheel 8. This lock pawl is pivotally mounted on the shaft 10 and its one end opposite to the ratchet wheel 8 is interlocked with a hydraulic oil cylinder mechanism 11 for releasing the engagement between the ratchet wheel and the lock pawl 9. As shown in FIG. 5, this hydraulic oil cylinder mechanism is comprised, for its main part of a cylinder 12 having an oil inlet 13 and an oil outlet 14 respectively, a piston 15 which is inserted and allowed to reciprocate within the cylinder 12 and a piston rod 16 to which said piston 15 is attached through a means which will be mentioned below. On the inner side of the piston rod 16 is formed a neck portion 17 having a head portion 18 on the extreme end thereof. The said piston 15 is inserted in the neck portion 17 so as to slide and reciprocate on the latter in a narrow range, and the interior of the cylinder 12 is divided by the piston 15 into hydraulic oil chambers 19 and 20. Along the neck part 17 of the said piston rod 17 is formed a slit-like oil passage groove extending to the inner surface of the head portion 18, and the said hydraulic oil chambers 19, 20 are communicated to each other through the oil passage groove 21. Further, a spring 22 is housed in the hydraulic oil chamber 20 located on the side of the oil outlet 14 of the cylinder 12. The piston 15 and piston rod 16 are always urged towards the side of the oil inlet 13 by the biasing force of the spring 22. The hydraulic oil motor 2 and hydraulic oil cylinder mechanism 11 in the power transmission system of the winch drum as mentioned above are disposed respectively in the hydraulic oil circuit as shown in FIG. 2. This hydraulic oil circuit is a circuit for controlling the operation of earth-moving machine 27 already mounted on an ordinary vehicle for construction use, the said circuit comprising an oil tank 23, a hydraulic oil pump 24, oil pressure change-over valves 25, 26, a hydraulic oil cylinder mechanism 28 for earth-moving machine 27 and a hydraulic oil motor 2. The forward and reverse rotation and stop of the hydraulic oil motor 2 can be controlled through the oil pressure change-over valve 26 by allowing the hydraulic oil circuit on the side of hydraulic oil cylinder mechanism 28 for controlling the operation of the earth-moving machine and the hydraulic oil circuit on the side of the oil motor 2 to communicate to each other through an oil feed pipe 29 for feeding pressure fluid into the hydraulic oil motor 2. In the circuit on the side of the hydraulic oil motor 2, the oil inlet 30 of the hydraulic oil cylinder mechanism 11 for releasing braking power is communicated with a part between the oil motor 2 and the oil pressure change-over valve 26 through a branch pipe 32a, and the oil outlet 14 of the cylinder is communicated with an oil reservoir 30. The hydraulic oil circuit disposed between the hydraulic oil motor 2 and the oil pressure change-over valve 26 is comprised of a hydraulic oil conduit 31 for forward rotation and a hydraulic oil conduit 32 for reverse rotation which is connected with the above-mentioned branch pipe 32a.

Figure 6:
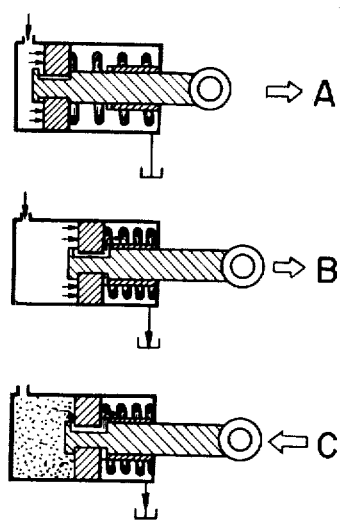
FIG. 6A, 6B and 6C are diagramatic views showing the operation of the hydraulic oil cylinder mechanism.

Now, the forward and reverse rotation and stop operation of the hydraulic oil motor 2 will be described below based on the above-mentioned construction of the brake mechanism and hydraulic oil circuit for the winch drum 1. At first, the oil pressure change-over valve 26 is operated to allow the oil feed pipe to be connected selectively with the pressure oil conduit 32 for reverse rotation, then the said oil motor 2 will rotate reversely. When the hydraulic oil motor 2 is running reversely, the pressure fluid is also fed through the oil branch pipe 32a into the hydraulic oil chamber 19 on the side of the oil inlet 13 of the hydraulic cylinder mechanism 11, and the piston 15 and piston rod 16 are slowed to extend by the action of the pressure fluid against the biasing force of the spring 22. Thus, by such extension of the hydraulic oil cylinder mechanism 11, the lock pawl 9 interlocked with the said mechanism is allowed to turn in clockwise direction around the pivotally mounted shaft 10 as shown in Fig. 4, and the lock pawl 9 is disengaged from the ratchet wheel 8, thereby permitting the winch drum 1 to rotate reversely. In this case, in the said hydraulic oil cylinder mechanism 11, the piston 15 is at first allowed to move against the biasing force of the spring 22 by the action of the pressure fluid into the hydraulic oil chamber 19. When the piston 15 has reached and engaged with the stepped portion at the outer extreme end of the neck portion 17, the oil passage groove 21 is shut off thereby. At this position, it becomes possible for the piston rod 16 to move together with the piston 15. As shown in Fig. 5, a cylindrical stopper 33 is inserted into the above-mentioned piston rod 16 within the cylinder 12. This stopper 33 is securedly attached to the inside on the side of the head of the said cylinder 12 and is adapted to allow the sliding movement of the piston rod therein. When the piston rod 16 has extended to such a extent that the piston 15 engages with the extreme end of the said stopper 33, the oil passage groove 21 which has been kept in closed condition by then is opened, thereby allowing the hydraulic oil chambers 19, 20 to communicate to each other as shown in FIG. 6B and FIG. 6C. Thus, the pressure fluid in the hydraulic oil chamber 19 flows in the hydraulic oil chamber 20, and then the pressure fluid flown into the chamber 20 is allowed to drain into the oil reservoir 30 through the oil outlet 14. Consequently, the pressure in the above-mentioned hydraulic oil chamber 19 is reduced to such a level as required only for maintaining the spring 22 in its compressed condition. Further, when the oil pressure change-over valve is operated again to disconnect the communication between the oil feed pipe 29 and the respective hydraulic oil conduits 31, 32, the supply of pressure oil to the cylinder 12 is cut off, thereby to stop the hydraulic oil motor 2 and at the same time allow the piston 15 and piston rod 16 respectively to retract for returning to their original positions by the biasing force of the spring 22. By such retracting movement of the hydraulic oil cylinder mechanism 11, the lock pawl 9 will turn following after the former and engage again with the ratchet wheel 8, whereby a braking power is applied on the winch drum 1. In the above-mentioned embodiment of the present invention, the means for urging always the piston 15 towards the side of oil inlet 13 should not always be limited to such a spring 22, and any means capable of applying a biasing force for urging the piston 15 towards the side of oil inlet 13 may be employed. Moreover, the oil passage groove 21 of the piston rod 16 may be substituted by ones formed on the piston 15, and the groove 21 may have the form of perforation.

In the present invention as mentioned above, a ratchet wheel for locking mechanism is interlocked with a hydraulic oil motor, and a freely detachable lock pawl engageable with the ratchet wheel is interlocked with a hydraulic oil cylinder mechanism which is communicated with the hydraulic oil circuit disposed between the said hydraulic oil motor and the hydraulic oil pump, the said hydraulic cylinder mechanism being capable of maintaining the said locking mechanism in locked condition when the hydraulic oil motor is running forwardly and stopped, thereby preventing the winch drum from reverse rotation during the drum is running forwardly, together with applying a braking power on the said drum when the latter stops. Further, when the hydraulic oil motor is running reversely, the locking action of the locking mechanism is released by the action of the hydraulic oil cylinder mechanism, and therefore it is possible to allow the winch drum to reverse smoothly. Further, the above-mentioned hydraulic oil cylinder mechanism is subject to a biasing force in one direction only and the locking mechanism is allowed to effect its locking action by such biasing force when the hydraulic oil motor is running forwardly and stopped, and effect its unlocking action against the biasing force of the spring by the pressure fluid fed therein from the hydraulic oil circuit disposed between the hydraulic oil motor and the oil pressure change-over valve. Therefore, it is not always necessary to provide a new one as the above-mentioned circuit for actuating the hydraulic oil cylinder, and so such hydraulic oil circuit as already mounted on a vehicle such as a tractor, etc. may be utilized. Further, such locking mechanism interlocked with the hydraulic oil cylinder mechanism is comprised only of a ratchet wheel and a lock pawl, and so it is very simple in construction so that according to this invention it is possible to render the whole construction of the hydraulic winch compact and also facilitate and simplify its fitting to and removal from a vehicle, etc. Besides the above, in the hydraulic oil winch according to the present invention, the locking mechanism is adapted to operate automatically by the extension and retraction of the hydraulic oil cylinder mechanism as mentioned above. Therefore, it is unnecessary to effect artificial adjustments required in case of prior art band type brakes, and also it is possible to rotate forwardly and reversely and stop the winch drum simply and exactly at any time only through the change-over operation of the oil pressure change-over valves.

What is claimed is:

1. A hydraulic fluid winch comprising a hydraulic fluid pump, a rotatable winch drum, a hydraulic fluid motor for driving said winch drum, a change-over valve, a fluid feed pipe connecting said change-over valve to said pump, a first fluid conduit connecting said change-over valve to said fluid motor for effecting rotation of said winch drum in one direction by said fluid motor and a second fluid conduit connecting said change-over valve to said fluid motor for effecting rotation of said winch drum in a direction opposite to said one direction by said fluid motor, said hydraulic fluid motor having a driving shaft, a one-way clutch connected to said driving shaft, a ratchet wheel mounted through said one-way clutch on said driving shaft, a lock pawl movable into and out of engagement with said ratchet wheel, a hydraulic fluid actuating mechanism for moving said lock pawl, said mechanism including a hydraulic cylinder having a fluid inlet in communication with said second fluid conduit and a fluid outlet, spaced from said inlet, a piston slidably carried in said cylinder, means for constantly urging said piston along said cylinder toward said fluid inlet, abutment means for stopping movement of said piston in the direction of said fluid outlet, a piston rod having one end located exteriorly of said cylinder connected to said lock pawl and its other end extending within said cylinder and said piston rod being movable relative to said cylinder, said piston rod having fluid passage means and said piston being carried on said piston rod and movable relative to said piston rod between a first position wherein said fluid passage means is open so that fluid flow from said inlet to said outlet is permitted and a second position wherein said fluid passage means is closed by said piston.

2. A hydraulic fluid winch as set forth in claim 1 wherein a second change-over valve is provided for operating earth-moving mechanism and is connected to said fluid feed pipe.

3. A hydraulic fluid winch as set forth in claim 1 wherein said winch drum and said hydraulic fluid motor are connected through a gear train.

* * * * *